US010356338B2

United States Patent
McDevitt

(10) Patent No.: US 10,356,338 B2
(45) Date of Patent: Jul. 16, 2019

(54) VIRTUAL THREE DIMENSIONAL VIDEO CREATION AND MANAGEMENT SYSTEM AND METHOD

(71) Applicant: HSNi, LLC, St. Petersburg, FL (US)

(72) Inventor: John McDevitt, Clearwater, FL (US)

(73) Assignee: HSNi, LLC, St. Petersburg, FL (US)

( * ) Notice: Subject to any disclaimer, the term of this patent is extended or adjusted under 35 U.S.C. 154(b) by 50 days.

(21) Appl. No.: 15/223,174

(22) Filed: Jul. 29, 2016

(65) Prior Publication Data

US 2017/0034501 A1 Feb. 2, 2017

Related U.S. Application Data

(60) Provisional application No. 62/199,410, filed on Jul. 31, 2015.

(51) Int. Cl.
| | |
|---|---|
| *H04N 5/247* | (2006.01) |
| *H04N 5/232* | (2006.01) |
| *G06T 3/00* | (2006.01) |
| *G06T 3/40* | (2006.01) |

(52) U.S. Cl.
CPC ........... *H04N 5/247* (2013.01); *G06T 3/0012* (2013.01); *G06T 3/4038* (2013.01); *H04N 5/232* (2013.01)

(58) Field of Classification Search
CPC ...... H04N 5/247; H04N 5/232; G06T 3/4038; G06T 3/0012
See application file for complete search history.

(56) References Cited

U.S. PATENT DOCUMENTS

| | | | | |
|---|---|---|---|---|
| 5,758,043 | A * | 5/1998 | Takizawa | H04N 1/40 |
| | | | | 358/1.16 |
| 9,204,041 | B1 * | 12/2015 | Campbell | H04N 13/239 |
| 2001/0026683 | A1 * | 10/2001 | Morimoto | G02B 7/28 |
| | | | | 396/89 |
| 2002/0028014 | A1 * | 3/2002 | Ono | H04N 13/296 |
| | | | | 382/154 |
| 2004/0155975 | A1 | 8/2004 | Hart et al. | |
| 2006/0139475 | A1 * | 6/2006 | Esch | G03B 37/04 |
| | | | | 348/340 |
| 2008/0043095 | A1 | 2/2008 | Vetro et al. | |
| 2013/0050507 | A1 * | 2/2013 | Syed | H04N 1/00137 |
| | | | | 348/207.1 |
| 2013/0222640 | A1 * | 8/2013 | Baek | G11B 27/3027 |
| | | | | 348/231.99 |

(Continued)

FOREIGN PATENT DOCUMENTS

JP 2010026332 A 2/2010

OTHER PUBLICATIONS

International Search Report for PCT/US2016/044699 dated Oct. 17, 2016.

*Primary Examiner* — Tat C Chio
(74) *Attorney, Agent, or Firm* — Arent Fox LLP

(57) ABSTRACT

A method and system is provided for the creation, management, and distribution of two dimensional video content that appears to a viewer as having a third dimension of depth. The system includes a camera array with multiple cameras at respective different positions that coordinates the off-center rotating motion of apertures that are part of diaphragms in the camera lens systems. The resulting images from each camera in the array are stitched together to create a larger content field and only a portion is displayed at any one time.

29 Claims, 10 Drawing Sheets

(56) References Cited

U.S. PATENT DOCUMENTS

| | | |
|---|---|---|
| 2014/0146394 A1 | 5/2014 | Tout et al. |
| 2014/0361956 A1 | 12/2014 | Mikhailov et al. |
| 2014/0368621 A1* | 12/2014 | Michiyama ........ H04N 5/23216 348/50 |
| 2016/0295128 A1* | 10/2016 | Schnittman ........ G06K 9/00255 |

* cited by examiner

US 10,356,338 B2

VIRTUAL THREE DIMENSIONAL VIDEO CREATION AND MANAGEMENT SYSTEM AND METHOD

CROSS REFERENCE TO RELATED APPLICATION

The present application claims priority to U.S. Provisional Patent Application Ser. No. 62/199,410, entitled "Virtual Three Dimensional Video Creation System", filed on Jul. 31, 2015, the entire contents of which are incorporated herein by reference into the present application.

FIELD OF THE INVENTION

The present invention relates to a method and system for the creation, management, and distribution of two dimensional video content such that the video content appears to a viewer to have a third dimension of depth. In an exemplary aspect, traditional video content is captured and manipulated in such a way that it can be presented to a viewer on a standard video display and have the appearance of depth even without the use of specialized display or viewing equipment.

BACKGROUND OF THE INVENTION

Video content may be captured and managed in a variety of ways. In particular, there have been multiple ways in which the illusion of depth has been created for the viewer through the use of enhanced two dimensional video. Historically, these approaches for creating the illusion of depth (i.e., three dimension or 3D video) have included amongst other techniques, Two-Color Anaglyphic 3D, Side-by-Side 3D, Top-Bottom 3D, Full High Definition 3D, Checkerboard 3D, Active Shutter, Passive Shutter, Circular Polarization, Auto-Stereoscopic Display, Interference Filter Technology, and other methodologies. All of these means have required specialized equipment (e.g., generally special viewing glasses and/or special displays) for the viewer to experience depth in video.

These approaches to create 3D video experiences are all complicated for the content creators, the content distributors, and especially for the viewer who is required to acquire and use specialized equipment. Furthermore, to maintain the illusion of 3D, the viewer is often required to have a particular physical position relative to the display device. Additionally, it is somewhat common for viewers to experience ill effects (often nausea or headaches and there have been concerns of possibly greater neurological impacts) from viewing 3D content by means of the existing methods. All of these factors combine to create a somewhat high degree of user dissatisfaction with the current 3D methodologies as evidenced by the very low consumer adoption of 3D technologies in the home consumer electronics market. Additionally, even of those consumers that purchased the equipment, few utilize it on a frequent basis. Though many consumers desire a 3D experience, the current methods to provide it have too many shortfalls for the average consumer.

An additional drawback of traditional 3D is that it is single perspective 3D—the viewer is always at a single predetermined perspective—there is not any holographic or near holographic ability for the viewer to change their perspective or otherwise "see around" an object that appears to be in the foreground in order to more clearly see an object in the background.

SUMMARY OF THE INVENTION

Accordingly, what is needed is a system and method to provide a virtual 3D experience that does not require the consumer to utilize specialized display or viewing equipment. Furthermore, additional benefit would come from a system that would provide a near holographic, multi-perspective 3D viewing experience. Thus, the system and method disclosed herein provides a technique to combine specially produced video from an array of multiple cameras to create a virtual 3D experience that does not require any specialized display or viewing equipment and may also provide a multi-perspective virtual 3D experience.

In an exemplary embodiment, the present invention provides a system and method that coordinates the off-center rotating motion of apertures that are part of diaphragms in camera lens systems on a set of cameras that results in images that are generally more sharply in focus at the center of each camera's images. Center focus is generally how each human eye "works"—with sharper focus and a greater degree of detail in the center of the field of view and softer focus on the edges. Then the center foci of the two human eyes are coordinated to allow perception of the 3D real world. Thus, generally when an individual sees an image with sharp center focus and slight edge blurring, the item in the center seems to stand out more, as if it was located closer to the viewer. The resulting images from each camera in the array are stitched (i.e., combined) together to create a larger content field, only a portion of which is displayed at any one time, but each image having a virtual 3D effect and then by changing which portion of the image field is displayed a multi-perspective virtual 3D effect may be achieved. The relative camera locations, the size(s) rates, and directions of rotation of the apertures can all be adjusted to create alternative effects for the viewer experience.

Further, in accordance with the exemplary embodiment, the portion of the content field (i.e., the field of view) displayed on a viewing device at a given time is based on viewing data received from the viewing device that indicates the perspective that the field of view should exhibit of the larger content field at a given time. For example, in one aspect, this view perspective data can be generated by the viewing device in response to an input signal received from a user of the viewing device. In another aspect, the view perspective data can be generated by motion sensors that detect a position of a viewer relative to the viewing device and/or internal sensor of the viewing device, such as an accelerometer, a touch sensor, a gyroscope, a magnetometer, an optical sensor, an inclinometer, and/or an inertial tracker.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To accomplish the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 illustrates a block diagram of a system for the Content and a field of view in accordance with an exemplary embodiment.

DETAILED DESCRIPTION OF THE EMBODIMENTS

Figure 1:
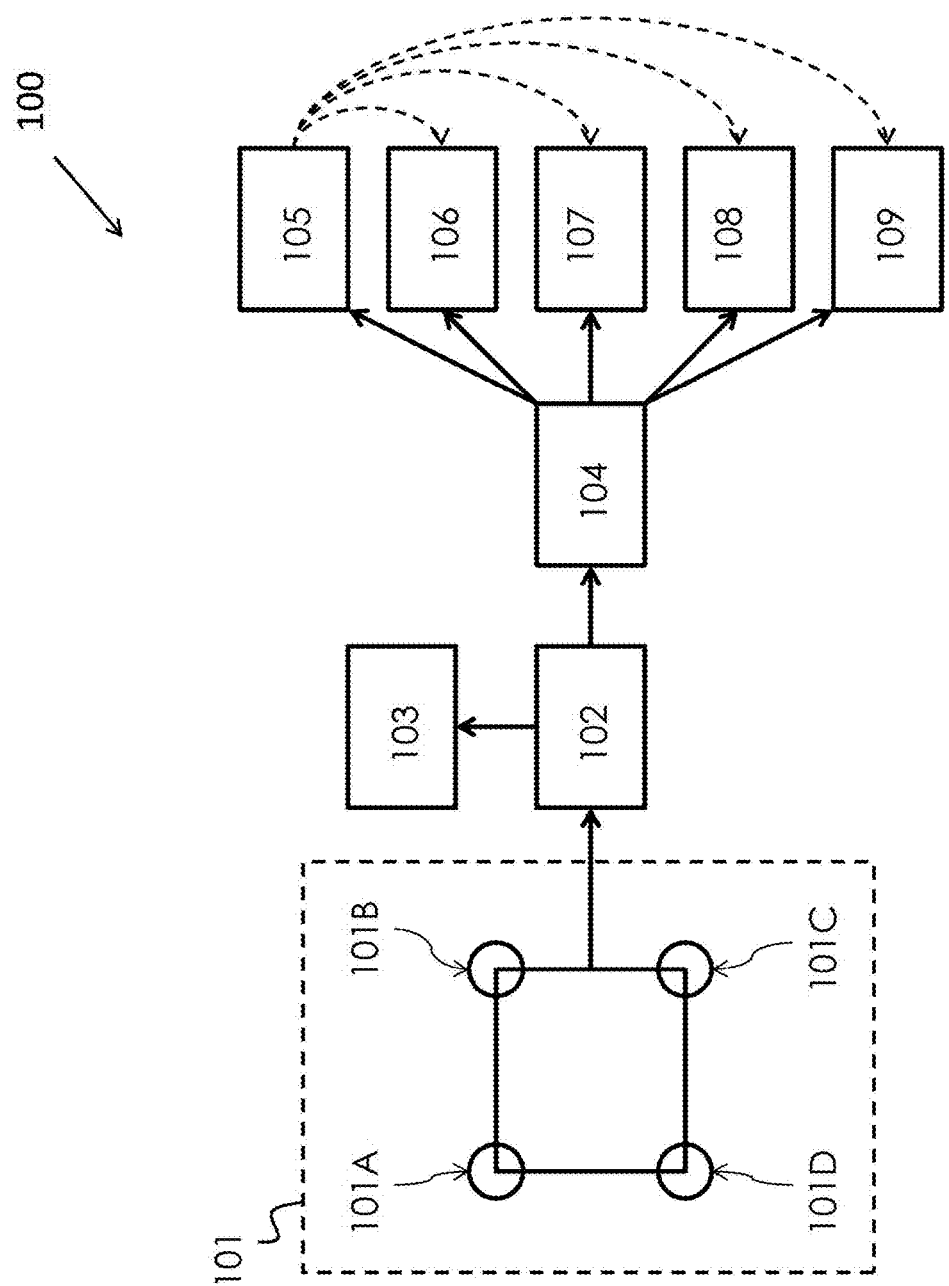
FIG. 1 illustrates a block diagram of a system for 3D content creation and management in accordance with an exemplary embodiment.

Various aspects of the invention are now described with reference to the drawings, wherein like reference numerals are used to refer to like elements throughout. In particular, the following detailed description outlines possible embodiments of the proposed system and method disclosed herein for exemplary purposes. The system and method are in no way intended to be limited to any specific combinations of hardware and software. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

As will be described below, the system and method disclosed herein relates to the creation, management, and distribution of virtual 3D video content that can be viewed by a user (the terms "viewer" and "user" are used interchangeably herein) without the use of specialized viewing or display equipment. For example, the virtual 3D content can be played-out on a traditional TV, a tablet, a smart phone, a PC display, a large scale public display screen, a personal virtual reality (VR) viewer, etc. and viewed by the naked eye (e.g., without the use of specialized 3D glasses—including but not limited to two-color, polarized, or shutter glasses). The system and method provides for video content creation and management (including but not limited to audio, video, images, metadata, contextual data and transactional data, collectively, the "Content"), such that the Content appears to have depth, beyond a standard two dimensional image (i.e., to have three dimensions, "3D"). The Content resulting from the disclosed system is broadly displayable (generally agnostic to device type, manufacturer and/or operating system). Furthermore, in one exemplary implementation, the Content can be displayed on a stationary display and can provide a near-holographic experience (e.g., the image changes as the viewer changes their point of view). Accordingly, if an object in the background is obscured by an object in the mid-ground the viewer may change their perspective or otherwise see "around" the obscuring object in the mid-ground to clearly see the object of interest in the background. Alternatively, the Content can be displayed on a movable display and the Content's points of view can be changed in relation to the change in position of the display device, or, alternatively, the Content can be displayed in a near-holographic manner on a movable display device and provide the Content's points of view that changes in relation to the change in position of the viewer and in relation to the change in the position of the display device. In one aspect, it should be appreciated that these three exemplary embodiments may need somewhat specialized display devices (e.g., tablets or smart phones) with appropriate software.

FIG. 1 illustrates a block diagram of a system 100 for creating and managing 3D content according to an exemplary embodiment of the present invention. As described herein the system 100 is referred to as a 3D Content and Creation and Management System (i.e., the "3DCCMS" or the "3DCCMS 100") and is provided for creating, managing and distributing Content (defined above) to various distribution systems and display device systems. According to the exemplary embodiment, the Content can be distributed in real-time (e.g., live Content), as pre-recorded Content, or as a combination of the two. The 3DCCMS has a variety of components with functions as described in more detail below.

Figure 2:
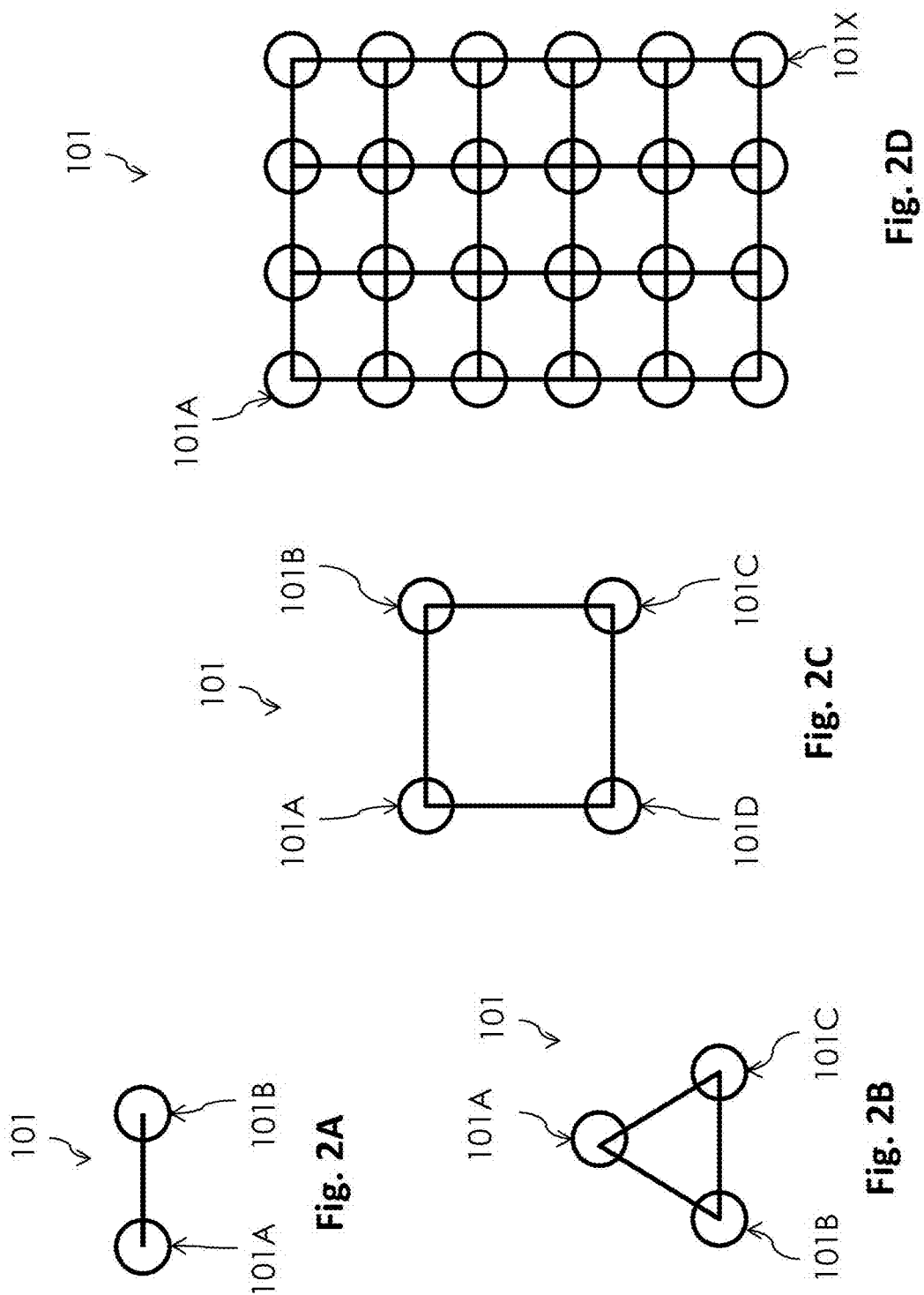
FIGS. 2A-2D illustrate block diagrams of various exemplary embodiments of the camera array according to the present invention.

As shown, the system 100 includes a camera array 101 (the terms array 101 and camera array 101 are used interchangeably herein) that is a set of two or more cameras (e.g., cameras 101A, 101B, 101C, 101D, . . . 101nth, etc.) (examples of which are shown in FIG. 2) that have a specialized diaphragm system (mechanical or digital) that allows the aperture to rotate around the diaphragm in a managed way to create an image that is more sharply focused in the center and less focused on the edges. Thus, according to an exemplary embodiment, one or a few cameras in array 101 that are creating an image by generating image data during operation that will correspond to the center of the user's field of view (discussed below) will be configured (based on rotation of the aperture, for example) to create the sharply focused center of the field of view (e.g., a center section of the field of view). As described herein the cameras of the array 101 are described as being configured to capture an image or image data and/or generate an image or image data. Moreover, all of the data captured by each camera in array 101 is used (i.e., combined together as discussed below) to create the Content. The captured data can include, but is not limited to, still images, video images, contextual data, metadata and/or audio, according to the exemplary embodiment. Moreover, it should be understood that the description of a camera's configuration to capture images and/or image data is referring to the each camera's ability to capture an image using conventional techniques with the exception being that the aperture for each camera is configured to rotate around the camera's diaphragm according to one exemplary embodiment.

It is noted that a "center section" as described herein generally means the center, but should not be limited to the absolute mathematical center of the field of view and can be offset from the mathematical center according to exemplary embodiments. Moreover, the additional cameras that surround these center cameras will be configured slightly differently (again based on the rotation of aperture, for example) to create less focused or soft image content (e.g., slightly out of focus) around the periphery of the center of the field of view (i.e., a peripheral section of the field of view). Moreover, as the requested field of view changes, the configurations of the different cameras in the array 101 will be adjusted to seamlessly move the field of view, including the center section and peripheral section across the overall Content. This imaging technique mimic an individual's natural adjustment of his or her view as the individual moves his or her eyes.

The design of the exemplary configuration is different than a traditional camera system that has a fixed diaphragm with a center located aperture which can change in size (allowing in more or less light), but remains fixed in the center of the diaphragm. This fixed center aperture location produces content that is all in equal focus (i.e., the center and edge of the resulting image(s) all have the same sharpness of focus). The size, the direction of rotation, the speed of rotation, and all other of the aspects of the aperture, its motion, and the camera frame rate (e.g., the refresh or scan rate) and coordination of any and all of these elements for each camera and between the cameras that are part of the array 101 can all be managed and varied to produce different optical effects.

Moreover, according to the exemplary embodiment, the settings of the various aforementioned apertures may all be changed to produce the desired optical effects. For example, if it is desired to treat all of the Content as one single large field of view, the cameras in the center of the array 101 would be centered with very little aperture movement and the cameras at the edge of the array 101 would have significant aperture movement (relative to the central cameras) such that the entire Content would be singularly center focused. Furthermore, each camera (e.g., cameras 101A, 101B, 101C, 101D, . . . 101nth, etc.) can be individually controlled by a capture/integration/storage system 102 that also captures all of the data about each individual camera's settings in addition to the video content itself. The diaphragm system of each of the cameras is generally located between the lens and the body of the camera. Additionally, the diaphragm system can be affixed to a wide variety of readily available camera systems and is agnostic as to make, model, format, level of definition, operating system, and the like, of the camera.

According to exemplary embodiments, the array 101 of two or more cameras with the specialized diaphragm systems can be configured in a variety of ways, including a planar grid or non-planar (including parabolic sections—concave or convex—including spheres, partial spheres, hemispheres, and portions thereof) grid of various dimensions, shapes, organizational structures, and various numbers of cameras with the specialized diaphragm being utilized (the "array"). Additionally, the focus of the array 101 can be set such that the field in focus is planar or non-planar (including parabolic sections—concave or convex—including spheres, partial spheres, hemispheres, and portions thereof) and having various dimensions. Furthermore, it is understood that an array 101 according to an alternative embodiment can include one or more cameras being moved to different positions in the grid over the content capture time. The array 101 may be further enhanced with the addition of microphones at each of the camera locations (or alternatively at additional locations or at only a few of the camera locations) such that a "surround sound" type audio experience may be added to the video content, creating a more multi-sensory immersive experience—reinforcing the impression of 3D.

Also, in alternative embodiments, it should be understood that a similar optical effect that results from the aperture movement (e.g., center sharp focus and edge soft focus) can be achieved in either a live or recorded content environment by a digital manipulation of the content images, or alternatively through a variety of other physical optical manipulations of the lens systems. For example, as the field of view (to be displayed on the viewing screen changes), the system 100 is constantly determining which of the one or more cameras in the array 101 are providing the center focus of the video content and which cameras in the array 101 are providing the soft focus. According to the exemplary embodiment using digital manipulation, the system 100 will have all of the cameras using the cameras traditionally with centered diaphragm apertures (such that the center and edge of the resulting image(s) all have the same sharpness of focus) and then digitally adjust pixels (e.g., reducing the sharpness of focus of sets of pixels) in the image data provided by each of the cameras in the array 101, such that the center pixels for the field of view in the Content have a sharp focus while the peripheral pixels in the field of view have a soft focus. Moreover, as the field of view changes and the capture data from one or more different cameras is included in the field of view, the system 100 will adjust the view and, in particular, the display of pixels accordingly. In any case, the disclosed system 100 involves content images with a portion in sharp focus and a portion in soft (or out of) focus.

An array 101 can be created of cameras (e.g., cameras 101A, 101B, 101C, 101D, . . . 101nth, etc.) with standard aperture set-ups that capture content and then the effect of a portion of the content being in sharp focus and a portion of the content being in soft focus can be achieved digitally (e.g., in a live, recorded or live/recorded hybrid environment) while that effect is not present in the original content. Standard capture and digital manipulation is particularly important when the field of view is traversing the Content and the area that is the center of the field of view is changing. For example, when traversing from content captured by 101A to content captured by 101B there is a transition edge between the two images (i.e., both images have soft focus edges with separate sharp focus centers) that must be addressed to create a smooth experience, such that the center of focus remains clear even though the field of view being displayed on the viewing device is changing. In this embodiment, the relative positions and angles of each camera in the camera array 101 as well as the timing data of the respective image captures (e.g., images and/or video streams) is recorded and provided for the system 100. As a result, the system 100 can accurately combine the image data from each camera to create the combined viewing field for the camera array 101.

According to yet another embodiment, the array 101 does not have to be a collection of cameras at set locations.

Rather, Content from a set of cameras (including commercial, personal, phone or tablet cameras) can be collected and through location based information (by a variety of methods, including but not limited to, GPS location, Cellular Positioning System (CPS) location, image cues, and the like), coordination of the timing of the content capture (by a variety of techniques including, but not limited to, video image synchronization, sound synchronization, central GPS/CPS time synchronization, and the like), and digital content manipulation virtual 3D content and also near-holographic content may be created. For example, all of the content captured by all of the phone cameras at a football stadium could be collected, coordinated and consolidated into one multi-perspective near-holographic collection of Content. In this aspect, the system requires an understanding of the location of the cameras and the timing of the content capture.

As further shown in FIG. 1, the 3DCCMS includes a capture/integration/storage system 102. In general, system 100 can be one or more integrated systems that capture the content from each camera in the array 101 and "stitch" the various individual image files or streams from each camera together to create one combined file or stream (or related subsets thereof) that incorporates all of the data from all of the array 101, either in any of a live, recorded, or live with recorded manner. According to the exemplary embodiment, the stitching together of the data from each camera in the array 101 to create the Content is accomplished through the use of software (e.g., "stitching software") that is configured to match adjacent frames (e.g., on a pixel by pixel basis) from more than one file to create one larger file (e.g., similar to panoramic photos that are created by putting together multiple adjacent photos).

Figure 6:
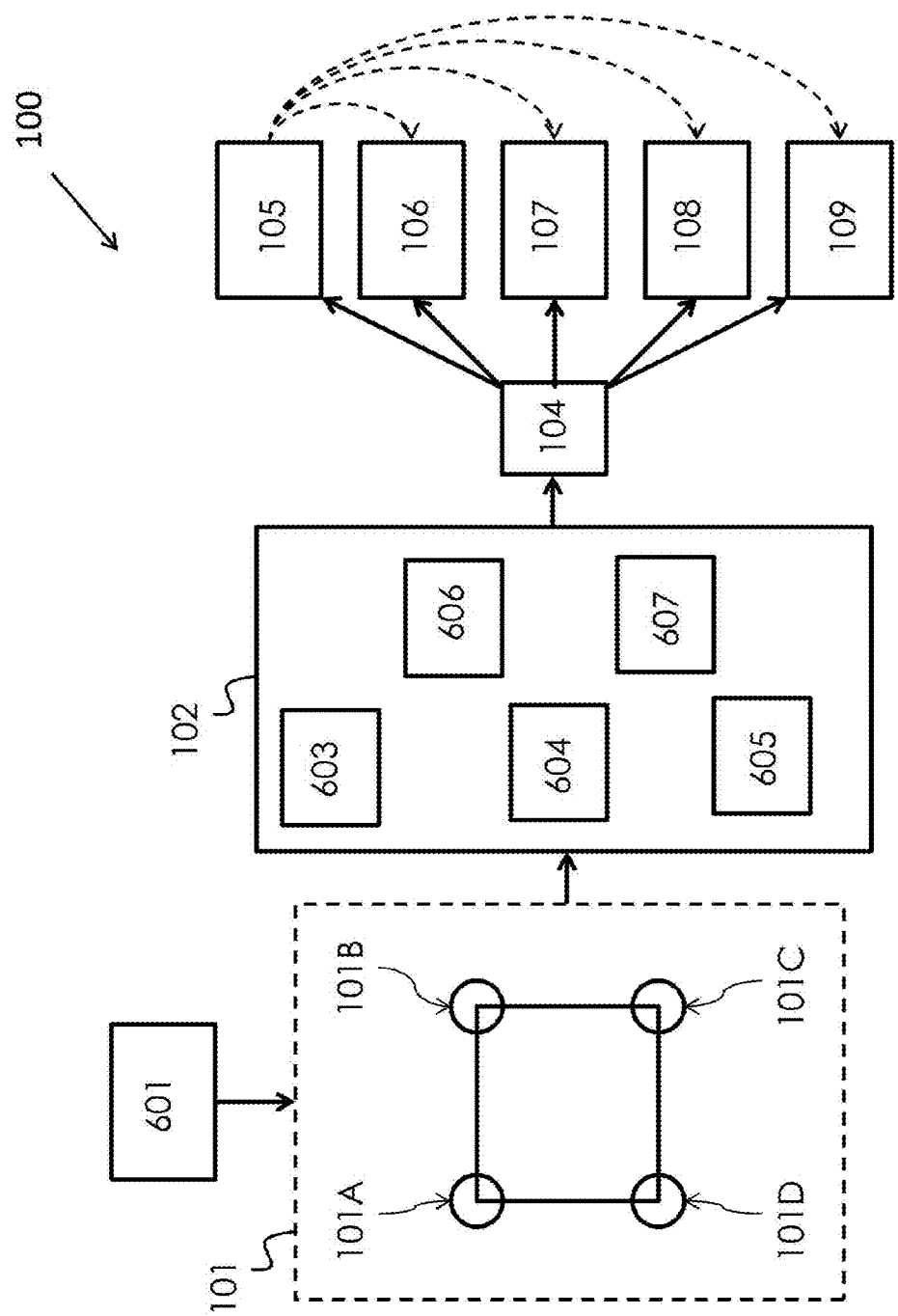
FIG. 6 illustrates a block diagram of a more detailed view of the exemplary components of the 3DCCMS according to an embodiment of the present invention.

According to the exemplary aspect, the capture/integration/storage system 102 may be any type of computing device that includes software code (e.g., processor executable instructions) in memory, that, when executed by a processor of the system 102, execute the algorithms described herein for the stitching software. A more detailed block diagram of system 100 is shown in FIG. 6 and an example of the hardware components of the exemplary capture/integration/storage system 102 will be described below with respect to FIG. 8.

In general, it is understood that the system 102 includes a computer processing unit (CPU) and electronic memory for storing the content received from the array 101 for processing. As described in detail below, the electronic memory can be a computer-readable medium that includes data storage, and, by way of example, and not limitation, can comprise RAM, ROM, EEPROM, CD-ROM, Flash memory or other types of electric, magnetic, or optical storage medium, or any other medium.

The stitching software is more specialized and sophisticated than conventional methods because it takes into consideration more than adjacent image content. Typically, traditional image/video processing software (even for a virtual reality application) predominantly performs the function as named—i.e., the software stitches together at overlapping points adjacent standard images to create one larger image with a minimum of gaps and duplication between the original partial images in the final larger image. According to the exemplary embodiment, each image or stream (i.e., originally captured, adjusted digitally following capture, or a combination of both) may have a center sharp focus and edge soft focus and a simple joining of each of these images would result in a poor visual experience with multiple points of focus. Thus, the stitching software may have a feedback loop to the array 101 to adjust the individual cameras as the view changes or, alternatively, in the one-to-one viewing experience where any simple content collection may be joined together and digitally manipulated to adjust areas of sharp and soft focus to create the impression of virtual 3D to the viewer.

Further, the exemplary stitching software is configured to take into consideration elements including camera related metadata items such as recording timing (e.g., timing data of image capture by each camera to facilitate the matching of frames to minimize synchronization and jitter issues), relative positions and angles of each camera with respect to one another, localized audio, optical settings, equipment specifics, frame rate, focal length, nature of the size and movement of the aperture, each camera image center, each camera field of view, and the like. The stitching software is configured to join or combine the images from each individual camera, such that the resulting Content is a coherent and cohesive whole—minimizing awkward transitions as the viewer traverses the field of view across the Content. Furthermore, the exemplary stitching software incorporates the metadata related to the images into the Content such that the display system is able to interpret and utilize the metadata to provide a robust viewer experience. Additionally, this system stores all of the captured and combined data in a format that can be distributed. Furthermore, the capture/integration/storage system 102 can be communicatively connected to secondary systems 103 such as the Internet or other systems and integrate additional content from such secondary systems 103 into the Content.

Additionally, in alternative embodiments the capture/integration/storage system 102 can also dynamically change the behavior of the cameras in the array 101 based on viewer or display device movements or point of view requests. These changes can happen in real time with change control commands to the cameras in the array 101 or changes to the digital Content manipulation. Alternatively, the changes can happen with recorded Content by digital manipulation of the Content.

Additional content can be provided by the secondary systems 103. Secondary systems 103 can include systems not included in the 3DCCMS, such as the Internet or image interpretation systems, sales systems, metadata systems, and the like.

Moreover, according to an exemplary embodiment, the distribution system 104 is a system configured to deliver the Content and materials from secondary systems 103 by a variety of mechanisms in a variety of formats to secondary distribution systems 105 or to directly connected display devices. The distribution system 104 can be connected to secondary distribution systems 105 or connected display devices directly or indirectly via wired or wireless communication methods.

According to the exemplary embodiment, there are a variety of methods/algorithms through which Content (and related data) distribution occurs, including secondary distribution systems 105, which can include, for example, CDNs (content distribution networks), Internet Protocol systems, cable systems, direct broadcast satellite systems, and Telco (wired & wireless) systems that in turn deliver the Content to display devices. Moreover, Content (and related data) may be distributed on traditional display device 106, which can include any type of standard TV, smart phone, tablet, or video display that is capable of displaying digital video content and/or stationary holographic display devices 107, which can include a stationary display device that is, through a variety of means, able to detect and provide different portions of the Content depending on the point of view of the viewer. Generally, the terms "display device(s)" and "viewing device(s)" are used interchangeably herein.

Moreover, the viewer movement detection can be achieved through a variety of mechanisms, including, for example, eye motion/focus recognition, motion cameras/sensors, communicatively coupled secondary devices, and/or touch based sensors that can direct the re-focus, and movable display device 108. Movable display device 108 can include a variety of movable display devices (e.g., smart phones and tablets that have a display screen and contain a collection of systems and sensors to measure and report on the display screen's relative physical position and movement, including amongst other things their angle location, rate of change, direction of change, and the like). Moreover, these movable display devices 108 are also capable of playing out the Content and based on relative movement of the display device, changing what parts of the Content is displayed as the field of view at any given moment based on the Content metadata and the device's physical state. Furthermore, Content (and related data) can be distributed on movable holographic display devices 109 that can include a variety of devices similar to the movable display devices 108, but also have the functionality of stationary holographic display device 107 (though with the ability to move). In this case, looking into the holographic movable display devices 109 is like looking through a movable window—the viewer can see "through" the viewing device seeing different parts of the Content as the field of view changes in relation to the movement of the display device. Additionally, the viewer may also look through the window at various angles, further changing the field of view.

As described above, the camera array 101 can include two or more cameras that can be a planar grid, a non-planar grid and so forth. FIGS. 2A through 2D illustrate various exemplary embodiments of the camera array 101 according to the present invention. For example, the camera array 101 shown in FIG. 2A includes a pair of cameras 101A and 101B, the camera array 101 shown in FIG. 2B includes three cameras 101A-101C, the camera array 101 shown in FIG. 2C includes a quadrant of cameras 101A-101D, and the camera array 101 shown in FIG. 2D includes a rectangular grid of cameras 101A to 101X. Thus, according to the embodiments shown in FIGS. 2A to 2D, each of the separate cameras of the array 101 is physically positioned at a different position in respect to the other cameras in the array 101. Collectively, the cameras capture image data that forms the combined viewing field of the camera array 101. By positioning each camera at different relative positions, the viewing angle, axis and the like, of the image data captured by each camera will be different than every other camera in the array 101.

As illustrated in each of FIGS. 2A to 2D, the arrays 101 can capture a broad area of content with cameras having multiple perspectives since each camera is positioned at a different location relative to the other cameras. When the content from the individual cameras is stitched together the result is the Content. The Content covers an area greater than that which is displayed at any one time on the display device, as will be discussed in more detail below. Thus, a display device at any one time will only show the given field of view (from the viewer's perspective), but through the various systems described herein, the viewing device can potentially change the field of view to show different parts of the Content.

This approach to viewing Content is consistent with the natural experience of viewing actual items in the physical world where one has a limited field of view at any given moment, but the person is able to change what is included in the field of view by changing viewing position to see different portions of the Content. In contrast, conventional configurations of multiple cameras are such that multiple cameras use standard diaphragms without the moving aperture (physically or digitally), and are connected in a manner such that the cameras are tightly combined together (all cameras facing out from a central point)—resulting in a single perspective viewing experience—the viewer is always in the center of the view never able to see "around" any object thus creating a very limited single perspective 3D experience.

The disclosed system 100 creates a multiple perspective experience where the individual is able to view objects from multiple angles (i.e., not necessarily all from the same origination point) to create a rich holographic-like 3D experience where the array 101 provides a more natural viewing experience that can move as the point of view of the viewer changes, for example, as the viewer's perspective changes in the physical world. Furthermore, this approach allows individuals to have this visual experience without the use of the commonly used 3D glasses or viewers.

Figure 3:
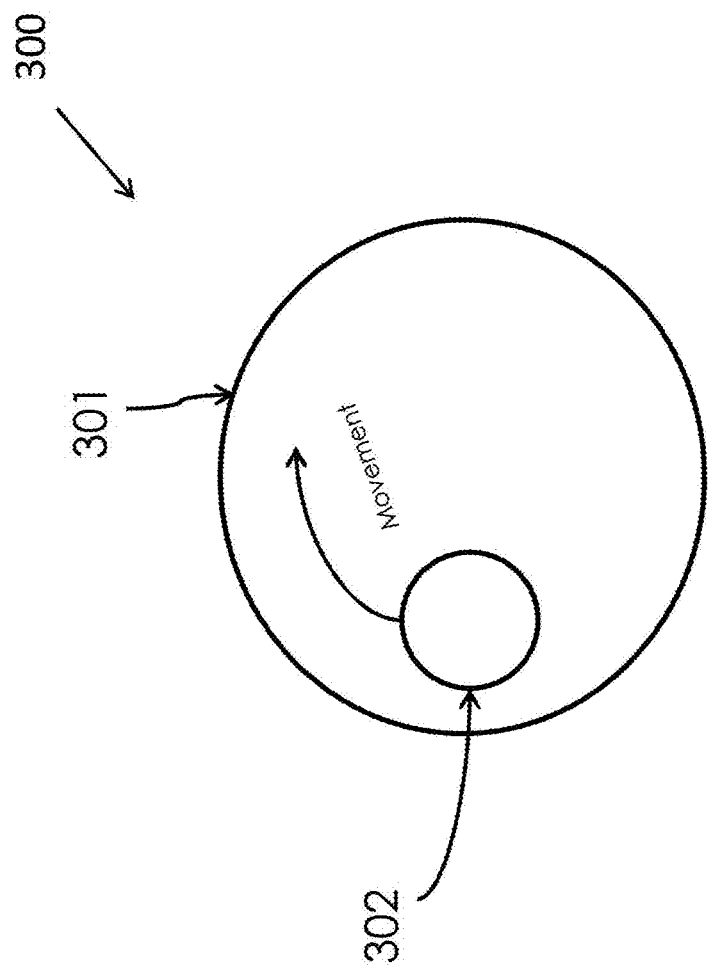
FIG. 3 illustrates a block diagram of a system for a camera diaphragm system in accordance with an exemplary embodiment.

FIG. 3 illustrates a block diagram of a system for a camera diaphragm system in accordance with an exemplary embodiment. As described above, each camera in the exemplary camera array 101 includes a specialized diaphragm system (mechanical or digital) that allows the aperture to rotate around the diaphragm to create an image that is more sharply focused in the center and less focused on the edges. As shown in FIG. 3, the camera 300 includes a diaphragm 301 and an aperture 302. Separately, each component is configured to operate in a similar manner as conventional optical structures. Thus, according to the exemplary embodiment, the diaphragm 301 is an opaque structure that is configured to stop the passage of light, except for the light passing through the aperture 302. The diaphragm 301 is placed in the light path of the lens of the camera 300. Moreover, the aperture 302 is an opening having a size that regulates the amount of light that passes through the lens of the camera 300. The center of the aperture 302 for each camera in the array 101 coincides with the optical axis of the lens system for that camera in the case where the center focus effect is created digitally.

In the exemplary embodiment, during operation when the camera 300 is capturing image data of a viewing field of the camera array 101, the aperture 302 rotates around an axis within the circumference of the diaphragm 301. The movement shown in FIG. 3 is illustrated as a clockwise movement, although, as noted above, the direction of rotation, size, the speed of rotation, and all other of the aspects of the aperture 302 can all be managed and varied to produce different optical effects.

FIG. 4 illustrates an example of video content and a field of view in accordance with an exemplary embodiment. As described above, the camera array 101 includes a plurality of cameras 101A to 101X, for example, that are disposed at different positions in the array with respect to each other. Moreover, each camera is configured to capture image data that is a portion of an entire viewing field of the camera array 101. When the image data captured by each camera in the array 101 is provided to the capture/integration/storage system 102, the system 102 combines this image data, using the stitching software, to create combined video content of the viewing field of the camera array 101. As shown in FIG. 4, the combined video Content is illustrated as combined Content 401. Moreover, during operation of the viewing device (e.g., devices 106, 107, 108, and/or 109), the viewing device is able to generate perspective viewing data that is representative of the perspective view of the Content 401 that is to be displayed on the viewing device. In one aspect, this perspective viewing data is in response to the user's requested view of the Content 401. Based on the perspective viewing data, the capture/integration/storage system 102 is configured to generate the field of view (e.g., field of view 402) from the combined video content and then cause this field of view to be displayed on the viewing device. As shown, the field of view 402 includes only a portion of the captured image data of the viewing field (i.e., the corresponding Content 401). Moreover, as explained below, as the perspective viewing data changes or is updated, the corresponding field of view that is displayed on the viewing device can also be changed to enhance the user's experience.

Figure 5A:
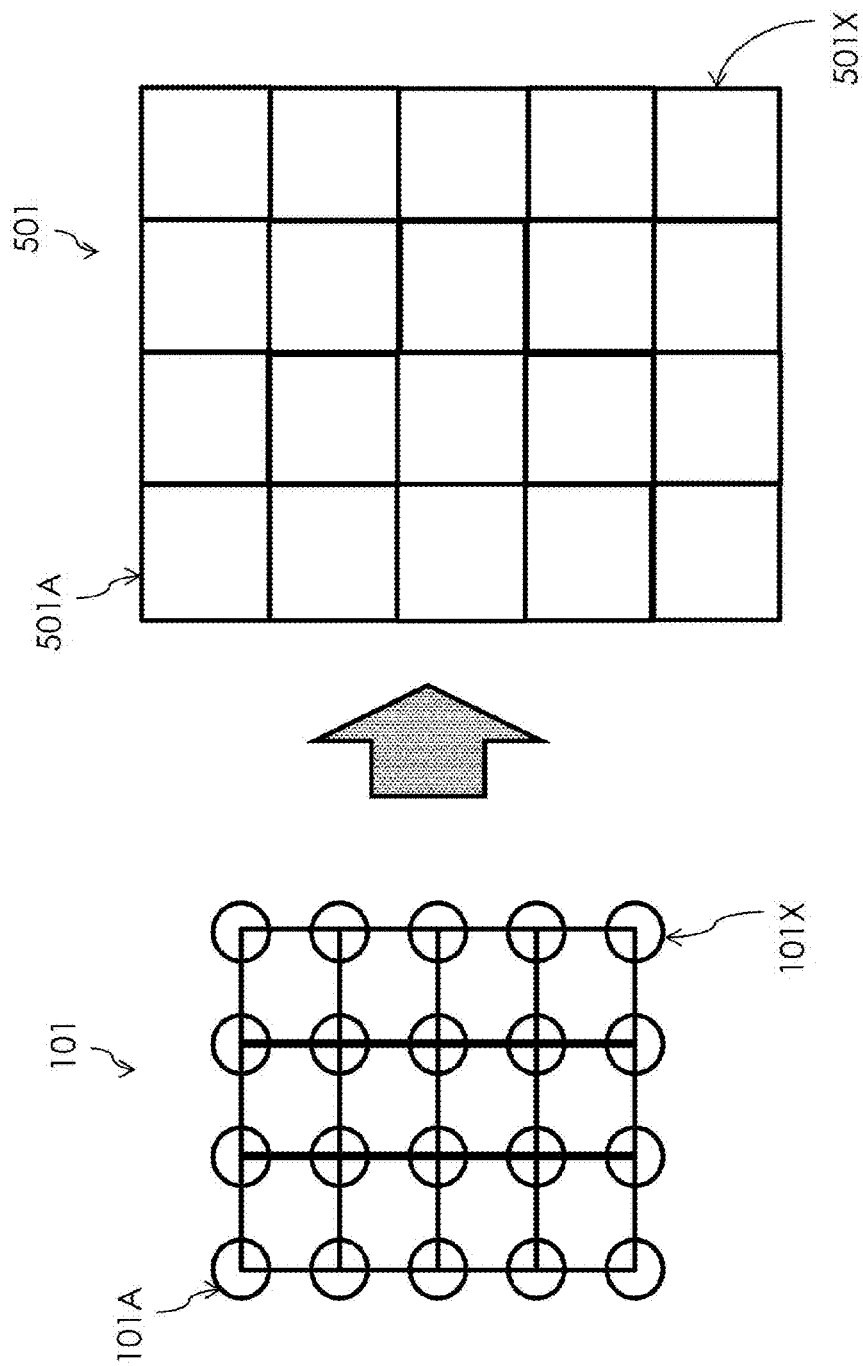
FIG. 5A illustrates a relationship between the exemplary camera array and corresponding viewing content created by the array during operation of system according to an exemplary embodiment of the present invention.

FIG. 5A illustrates a relationship between an array 101 and corresponding Content 501 created by the array 101 during operation of system 100 according to an exemplary embodiment of the present invention. As an example, the camera array 101 can correspond to the array illustrated in FIG. 2D, which includes a plurality of cameras 101A to 101X in a planar rectangular grid. As described above, each of the cameras are configured to capture data content and those individual pieces from each camera are able to be combined (i.e., "stitched") together, by the stitching software of the exemplary embodiment to create the larger collection of data known as the Content 501 (e.g., Content 401 of FIG. 4). In other words, each individual camera creates a portion of the overall content, for example, content 501A is image data produced from camera 101A, content 501X is image data produced by camera 101X, and so forth. Then, based on the stitching algorithm disclosed herein, the overall Content 501 created by the capture/integration/storage system 102 is the sum of all the data collectively captured by each camera in the array 101 and also includes the metadata that describes all of the data captured about the array 101 itself. It should be appreciated that while the Content 501A captured and generated by camera 101A is illustrated as a square box in FIG. 5A, this shape is provided only for illustrative purposes. The actual image data captured by each camera in the array 101 can have any form, shape, or the like, that is provided by any type of camera as would be known to one skilled in the art.

Figure 5B:
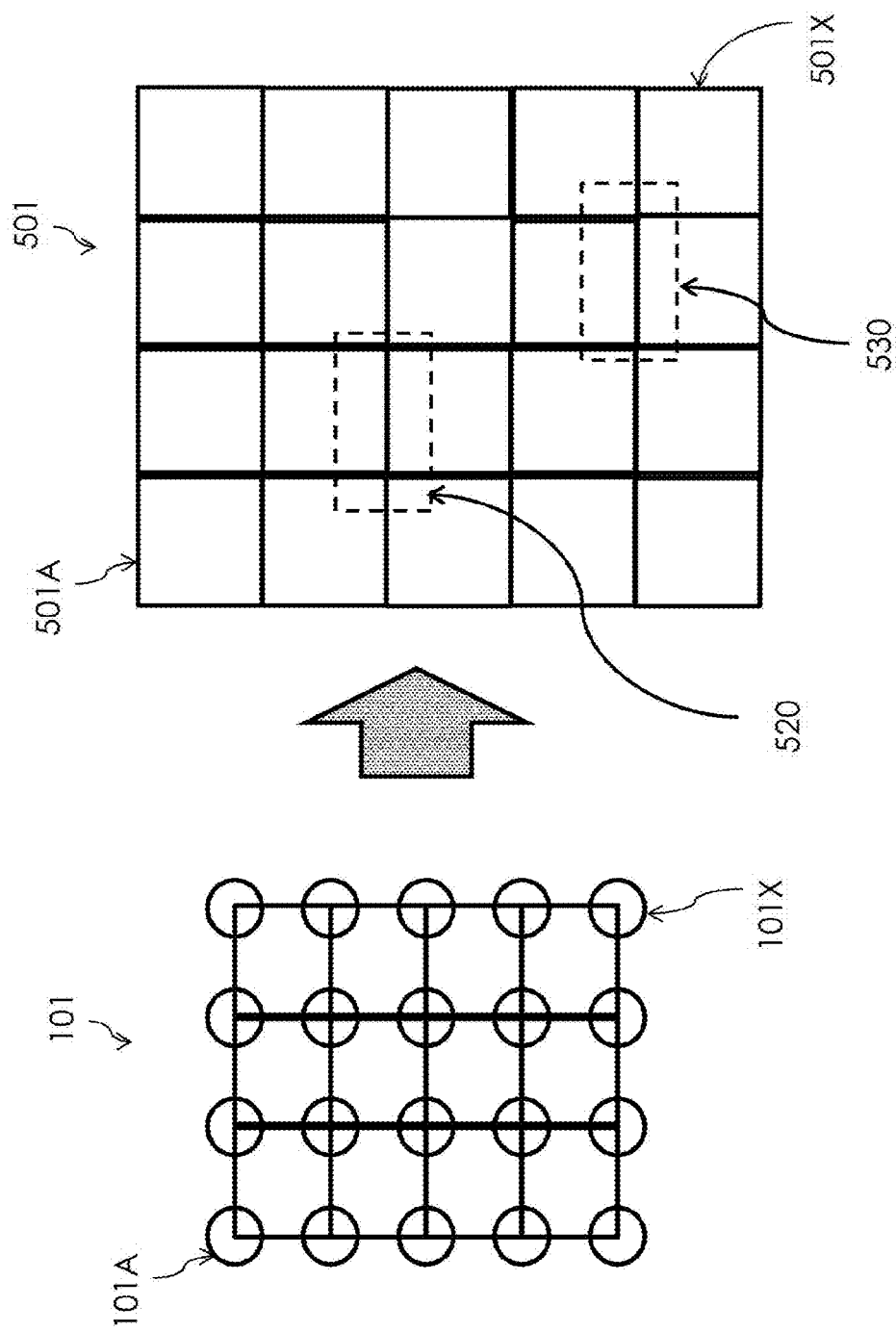
FIG. 5B illustrates the relationship between the exemplary camera array and the corresponding viewing content that includes varying fields of view during operation of system according to an exemplary embodiment of the present invention.

FIG. 5B illustrates the relationship between an array 101 and the corresponding Content 501 that includes varying fields of view during operation of system 100 according to an exemplary embodiment of the present invention. As illustrated, since each camera of the array 101 has a unique point of view, each from a different perspective when the data from the array 101 is combined by the stitching software, the resulting Content 501 is able to support fields of view from different perspectives creating the near holographic effect. Preferably, the effect of center focus to each field of view is added through a variety of the mechanisms as described herein with the resulting effect being a relatively rich 3D, like experience where the viewer is able to enjoy an original and lifelike visual experience. To ensure that it is a quality viewer experience, it is critical to support smooth traversing of the Content 501.

For example, 520 illustrates an exemplary field of view at a first moment (i.e., point of time) and 530 illustrates an exemplary field of view at a second moment that is subsequent to the first moment. According to exemplary embodiment, the view presented on the display device transitions from field of view 520 to field of view 530 with the elements, such as the center focus of the field of view, maintained even if the field of view is incorporating data from multiple cameras in the array 101. To that end, in one aspect the system 100 can digitally create the center focus effect and repeatedly recreate it as the field of view crosses the Content 501.

According to the exemplary embodiment shown in FIG. 5B, it should be appreciated that Content 501 is combined video/image content provided by the camera array 101 that corresponds to the viewing field of the camera array 101. Thus, this video/image Content 501 has first dimensions that correspond to the viewing field of the camera array 101. Moreover, as further shown, each of field of views 520 and 530 have second dimensions that are smaller than the first dimensions. As explained above, the field of views 520 and 530 are determined based on view perspective data received from the viewing device, and preferably, from the user of the viewing device. In other words, when the system determines a viewing perspective of the viewer relative to the viewing device, the system is configured to determine the appropriate field of view, which is a subset of the overall video/image Content 501.

Figure 5C:
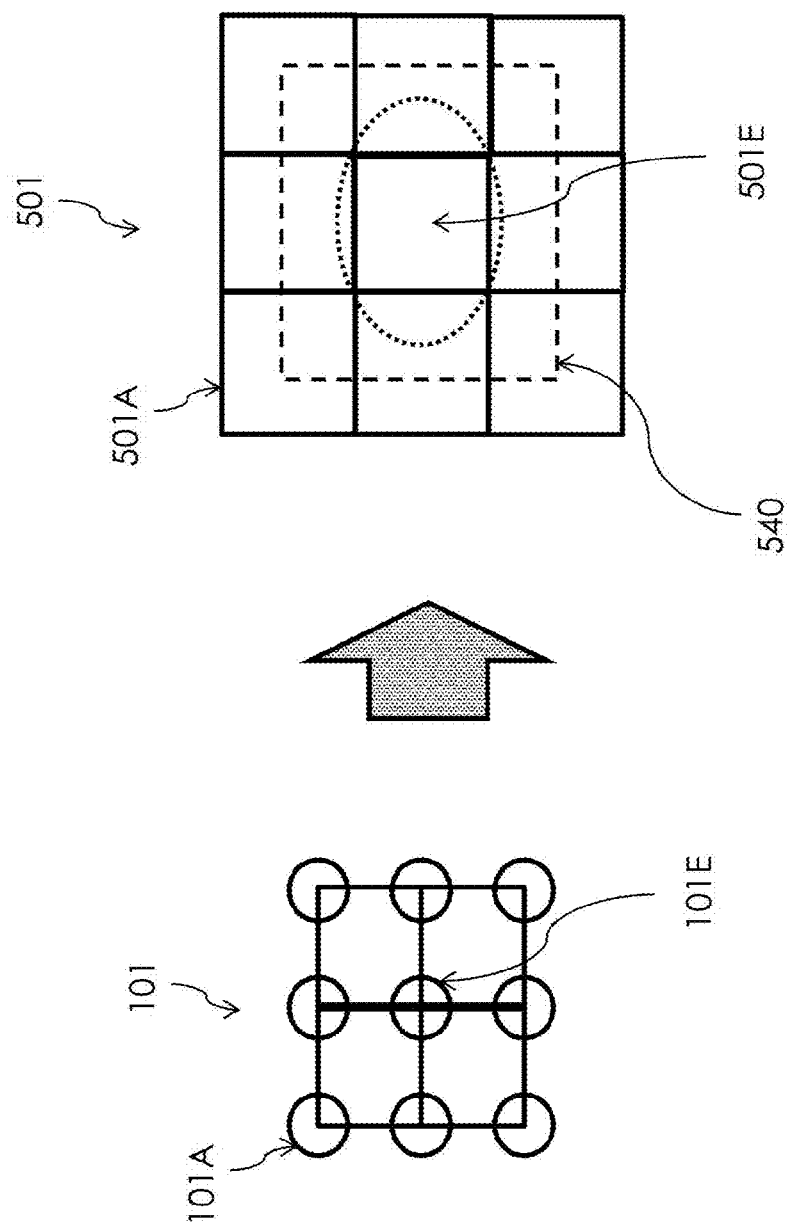
FIG. 5C further illustrates the relationship between an array, the corresponding Content, and an exemplary field of view according to an exemplary embodiment of the present invention.

FIG. 5C further illustrates the relationship between an array 101, the corresponding Content 501, and an exemplary field of view 540 according to an exemplary embodiment of the present invention. In this example, there are nine cameras (each illustrated as a circle, e.g., 101A) that respectively capture and generate nine separate sets of image data. For example, camera 101A captures and generates image data 501A, etc. In this instance, the field of view is (to be displayed on the screen of the viewing device) denoted by dashed box 540. Since camera 101E captures image data that will be in the center of the requested field of view 540, camera 101E will provide that image content that is in sharp focus while all of the other cameras in array 101 will provide content that is in soft focus. As explained above, this variation of sharp vs. soft focus can be generated mechanically or digitally. As a result of this process, the field of view 540 displayed on the screen of the viewing device will have the center content 501E (provided by camera 101E) in the sharp focus and all of the other content provided by all of the other cameras in the array 101 in soft focus. In other words, according to the example, the dashed oval in FIG. 5C may have the center/sharp focus correspond to the center section of the field of view 540, while all other content in the field of view 540 and outside the center focus may be soft focused corresponding to the peripheral section of the field of view. It should be appreciated that the degree of focus (or contrast) between the center section and peripheral section can be adjusted according to the system designer as long as the center section has a sharper focus relative to the peripheral section.

FIG. 6 illustrates a block diagram of a more detailed view of the exemplary components of the 3DCCMS 100 according to an embodiment of the present invention. As shown, the system 100 can include a camera array power source 601 that can be a separate power source (or, alternatively, included in the array 101, for example) coupled to the camera array 101 by a variety of hardware components. According to one embodiment, the camera array power source 601 can include, but not be limited to, battery, USB, AC power, AC to DC transformer, HDMI, Cat-5, and the like, Moreover, as illustrated in FIGS. 2A to 2D and described previously, the array 101 can be structured in a variety of ways as long as the relative camera positions, diaphragm actions, and content capture times are known by the computer processing unit (CPU) 603 of the capture/integration/storage system 102. Furthermore, the shape of the camera array 101 can change over the course of one video capture, as long as the CPU 603 is provided with the movements and/or locations of the individual cameras and adjusts the stitching operations and the corresponding creation of the Content accordingly. Preferably, the various cameras of the array 101 can be connected to the CPU 603 through a variety of hardware mechanism known to those skilled in the art, including, but not limited to, HDMI, Coax, RCA, S-Video, USB, Cat-5, Antenna, wireless, and the like. Additionally, the cameras of the array 101 can capture the content in a variety of formats including but not limited to MPEG2, MPEG4, HLS, h.264, h.265, HEVC, Flash, QuickTime, and the like, in a variety of resolutions including but not limited to SD, HD, 4K, UHD, HDRUHD, and the like. The various cameras of array 101 can also have different settings relative to format, focus, etc.

In addition, according to the exemplary embodiment, the CPU 603 can be an internal computer processor configured to manage systems, including management of a gateway to import content from the camera array 101. The CPU 603 is configured to execute one or more computer programs (e.g., the stitching software) to perform actions by operating on the input from the camera array 101 to create a combined file that constitutes the Content. Moreover, additional content besides the viewing field Content generated and provided by the camera array 101 can be added from secondary systems 103 to make a more robust Content file, as described above.

In general, the processes and logic flows described herein can be performed by CPU 603 alone or in combination with the a content coordinator 604 below. According to the exemplary embodiment, content coordinator 604 is a system/component configured to monitor and analyze the input content from the array 101 and stitch together the various inputs (from the array 101 and other inputs) into a coordinated Content file with related metadata that allows for the appropriate display of the Content depending on the viewing experience. The content coordinator 604 can be entirely internal to the system 100 or the content coordinator 604 may contain devices such as secondary systems, secondary images, a microphone, secondary data files, a camera and the like, to collect additional data related to the original content. In the exemplary embodiment, the content coordinator 604 is further configured to monitor and analyze the additional content and the combined original and additional content. For example, the content coordinator can implement a system that recognizes an item (or sets of items) in source Content and identifies additional data or metadata about the identified item(s), as will be discussed in more detail below. In this aspect, the content coordinator 604 may also be connected to other secondary systems 103. It should be appreciated to one skilled in the art that CPU 603 can be configured to perform the analysis/processing functions of the content coordinator 604 in one embodiment.

Moreover, as described above, the capture/integration/ storage system 102 can include electronic memory, which can be considered local digital storage 605. As would be understood to one skilled in the art, the local storage 605 can include, for instance, a disk shaped media such as CD-ROM (compact disc-read only memory), magneto optical disc, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program and/or content data therein. It should be appreciated to one skilled in the art that the CPU 603 can be configured to perform the analysis/processing functions of the content coordinator 604 and combined with the local storage 605 in one embodiment.

In addition, the capture/integration/storage system 102 can further include a content processor 606. In this aspect, the content processor 606 is a system/component configured to process the Content (e.g., original, additional, and combined) into a package that can be delivered to the display devices (i.e., devices 106, 107, 108, and/or 109) via one or more of the distribution systems 104. It should be appreciated to one skilled in the art that CPU 603, content coordinator 604, and local storage 605 can be configured to perform the processing functions of the content processor 606 in one embodiment. In other words, the CPU 603 can be configured to process the Content (e.g., original, additional, and combined) into a package that can be delivered to the display devices (i.e., devices 106, 107, 108, and/or 109) in an alternative embodiment.

The capture/integration/storage system 102 can further include an original/additional content output 607. Specifically, the 3DCCMS 100 is configured to directly pass the Content (e.g., original, additional, and combined) to the distribution system and/or display devices (i.e., devices 106, 107, 108, and/or 109) using any one of a variety of hardware mechanisms including but not limited, to, HDMI, Coax, RCA, S-Video, USB, Antenna, wireless, and the like.

Furthermore, as described above, the 3DCCMS 100 executes a stitching software that matches adjacent frames from more than one file to create one larger file (e.g., similar to panoramic photos that are created by putting together multiple adjacent photos). The stitching software, as well as additional software configured to control the operation of the various components includes each camera of the array 101, can be implemented according to one or more computer programs executed by CPU 603. The computer program(s) (e.g., a program, software, software application, script, or code) can be written in any form of programming language, including compiled or interpreted languages, declarative or procedural languages, and it can be deployed in any form, including as a stand-alone program or as a module (as discussed above), component, subroutine, object, or other unit suitable for use in a computing environment.

According to this disclosure, the term "module" refers to a software service or application executed on a computer, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. In one aspect, the module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

Moreover, in the exemplary embodiment, the capture/ integration/storage system 102 of the 3DCCMS 100 is a separate discrete piece of hardware, but in alternative embodiments, it could be integrated into the display device, a router, or other parts of the larger ecosystem.

As described herein, there are multiple embodiments of the disclosed system and method. For example, the first embodiment provides a first implementation of the inventive system disclosed herein. In this example, an individual is watching Content on a traditional display device 106, e.g., the individual's television. In this embodiment, a football game presentation broadcast as TV Service, for example, via the distribution system 104 from a cable service provider and is received by the traditional display device 106 that provides the viewer a visual experience with the appearance of depth, 3D like nature. In this instance, the viewer can input one or more controls (via a remote control device, for example) that request the display device 106 to adjust the viewing perspective (i.e., the "field of view") for the viewer on the screen of the display device 106. In response to this signal the system 100 can adjust the field of view accordingly by selecting different portions/subsets of the Content to be displayed on the display device 106.

According to a second embodiment, an individual is walking by a stationary holographic display device 107, for example, mounted on a wall in a mall and as the perspective of the individual changes, as they walk by, the content on the stationary holographic display device 107 changes in response to the individual's movement, such that it provides an experience similar to walking by a window where the view changes as the individual moves past the window. In this aspect, the holographic display device 107 or a connected device can include a variety of different types of sensors (e.g., motion or tracking sensors and the like) configured to detect the position of the individual with respect to the screen of the holographic display device 107. As a result, the sensors can determine the relative angle of the individual corresponding to the screen (i.e., the user's viewing angle) and can adjust the field of view of the Content being displayed on the screen accordingly.

According to a third embodiment, a viewer is moving a movable display device 108. In this example, a tablet with the appropriate software and internal sensors (which may include one or more of an accelerometer, a touch sensor, a gyroscope, a magnetometer, an inclinometer, an optical sensor, an inertial tracker and the like) is moved relative to the viewer and the viewer sees the object depicted in the Content from different perspectives that are directly related to the position and or movement of the movable display device 108 as the movable display device 108 moves. Furthermore, this embodiment could also address a limitation of traditional virtual reality experiences. Since the majority of the virtual reality content creation systems are a collection of cameras all facing outward from a central single point they create a single point perspective experience. Given the structure of the array 101 disclosed herein and the rest of the inventive system, this embodiment can be used in a virtual reality display device and provide a semi-off rails virtual reality experience in that the viewer is not limited to a predetermined single point perspective view.

According to a fourth embodiment, an individual is moving a movable holographic display device 109. The general experiences of the second and third embodiments are combined such that in this example the tablet with appropriate software and internal sensors (which may include one or more of an accelerometer, a touch sensor, a gyroscope, a magnetometer, an optical sensor, an inertial tracker and the like) is moved and/or the viewer also moves then the Content changes in direct relation to the viewer and device movements.

For each of the foregoing examples, it is contemplated that the following exemplary processes can be performed according to one refinement of the exemplary embodiment. Concurrently (or subsequently), the capture/integration/storage system 102 passes information about the Content to secondary systems 103 that in turn recognizes items in the Content. In particular, the secondary systems 103 can identify, for example, the general subject matter of the Content (e.g., a football game/program) or one or more specific items (e.g., a jersey, a team logo, or the like) in the Content being displayed on the display device (i.e., devices 106, 107, 108, and/or 109). The capture/integration/storage system 102 in conjunction with the secondary systems 103 then presents the viewer of the display devices 106, 107, 108, and/or 109 with other content of football related products that the individual could purchase and also browse related products, or get more detailed information about the products. This information can be obtained from the secondary systems 103 (e.g., the Internet) and can include product advertisements, videos, and the like. One exemplary system that recognizes an item (or sets of items) in source content and identifies additional data or metadata about the identified item(s) are U.S. Pat. Nos. 9,167,304 and 9,344,774 and U.S. patent application Ser. Nos. 14/940,283 and 15/132,653, the contents of each of which are hereby incorporated by reference.

Moreover, in another refinement of the exemplary embodiments, the 3DCCMS 100 either automatically, or in response to user control, launches an electronic shopping application enabling the user to purchase one or more of the displayed products. Exemplary applications include the electronic shopping systems disclosed in U.S. Pat. Nos. 7,752,083, 7,756,758, 8,326,692, 8,423,421, 9,117,234, and 8,768,781, and U.S. patent application Ser. Nos. 13/792,628, 14/731,594 and 15/098,705, the contents of each of which are hereby incorporated by reference.

Additionally, according to further refinement of the exemplary embodiments, the 3DCCMS 100 may also utilize secondary systems to incorporate a pointer into the Content or use the related pointer to aid in point of view navigation within the content. Exemplary applications include the pointer and navigation systems disclosed in U.S. Pat. Nos. 8,717,289, 9,094,707 and 9,294,556, and U.S. patent application Ser. No. 15/040,021, the contents of each of which are hereby incorporated by reference.

Figure 7:
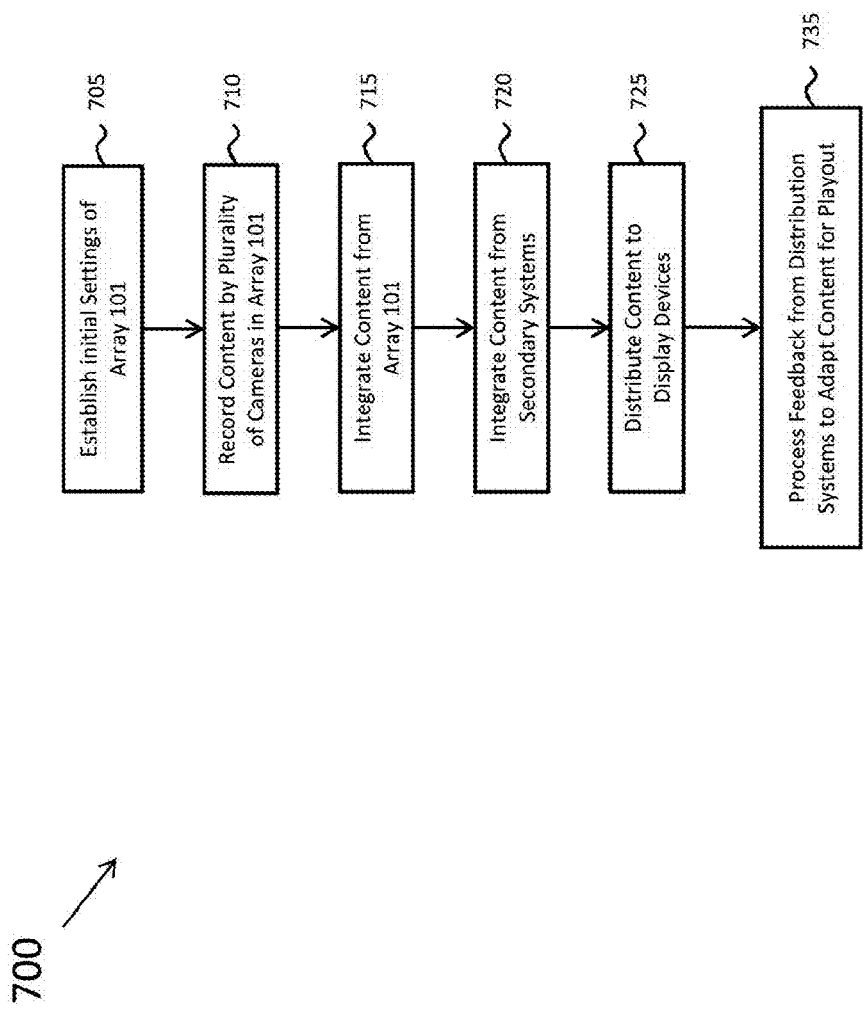
FIG. 7 illustrates a flowchart for a method for creating, managing and distributing virtual 3D content in accordance with an exemplary embodiment of the present invention.

FIG. 7 illustrates a flowchart for a method for creating, managing and distributing virtual 3D content in accordance with an exemplary embodiment of the present invention. The exemplary method is described with respect to the components of FIG. 1 and their associated functionality as discussed herein. Initially at step 705, the camera array 101 is configured with initial settings covering the descriptive information about the array 101 itself. As discussed above, the initial settings can include, for example, camera locations and angles with respect to the other cameras in the array 101, the aperture settings for each camera, and the like. The content creator (e.g., system administrator) generally establishes these initial settings of the array 101 in order to optimize the viewer's experience when consuming the Content, as should be appreciated based on the foregoing disclosure. Next, at step 710, the data obtained by each camera of array 101 is provided to capture/integration/storage system 102. Once the video is captured from each of the multiple cameras in the array 101, it can be integrated together along with the initial setting information using the stitching software to create the Content as a unified whole, either live, recorded, or a combination of both (step 715). At step 720, additional data may be integrated from secondary systems to further enhance the Content and the resulting viewer experience. It should be appreciated that step 720 is optional according to one embodiment. In either case, at step 725, the content is now ready to be distributed to play-out on display devices (i.e., devices 106, 107, 108, and/or 109). Depending on the playout device and the viewer consumption activity, there is a feedback loop that is processed at step 735 to adapt the Content that is distributed allowing the viewer to adjust their point of view by the system providing to the viewing device (i.e., devices 106, 107, 108, and/or 109) alternative portions of the Content.

Figure 8:
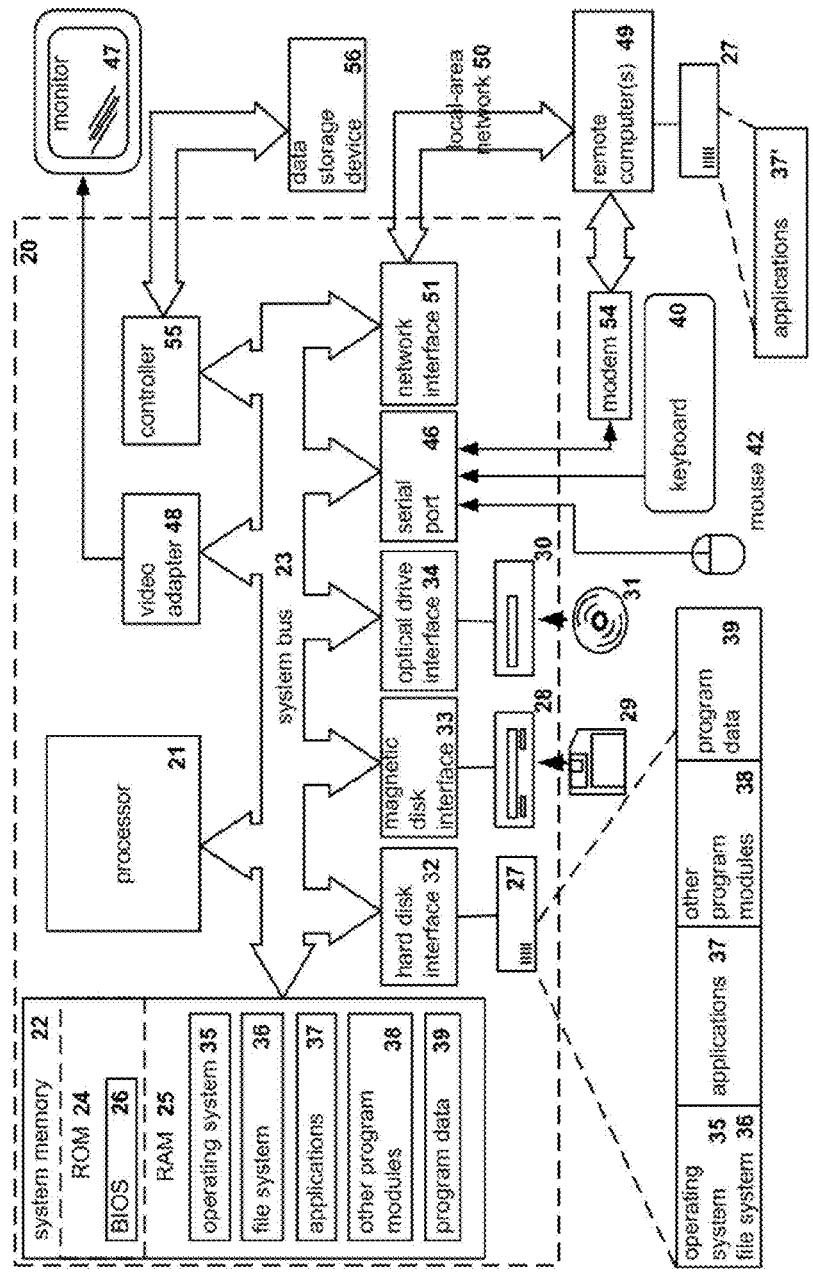
FIG. 8 illustrates an example of a general-purpose computer system on which the disclosed systems and method can be implemented.

Finally, FIG. 8 illustrates an example of a general-purpose computer system (which may be a personal computer or a server) on which the disclosed systems and method can be implemented according to an example aspect. It should be appreciated that the detailed general-purpose computer system can correspond to the capture/integration/storage system 102 described above with respect to FIGS. 1 and 6, for example. Moreover, the remote computer(s) 49, as described below, can correspond to the secondary systems 103, as discussed above.

As shown in FIG. 8, the computer system 20 includes a central processing unit 21, a system memory 22 and a system bus 23 connecting the various system components, including the memory associated with the central processing unit 21. The central processing unit 21 can correspond to the CPU 603 and/or content coordinator 604 the system memory 22 can correspond to local storage 605 of FIG. 6, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the computer system 20, such as those at the time of loading the operating system with the use of the ROM 24.

The computer system 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the computer system 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the computer system can be equipped with other peripheral output devices (not shown), such as loudspeakers, a printer, and so on.

The computer system 20 is able to operate within a network environment, using a network connection to one or more remote computers 49. The remote computer (or computers) 49 are also personal computers or servers having the majority or all of the aforementioned elements in describing the nature of a computer system 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the computer system 20 is connected to the local-area network 50 across a network adapter or network interface 51. When networks are used, the computer system 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by those skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A system for generating video content having an appearance of three dimensional depth, the system comprising:
   a camera array including a plurality of cameras arranged at different positions relative to each other and each camera being configured to capture video image data of a portion of the viewing field of the camera array, wherein each of the plurality of cameras includes a diaphragm configured to rotate during capture of the video image data and at least one aperture located off-center in the diaphragm and configured to rotate around the diaphragm when each camera captures the respective video image data;
   electronic memory configured to store the video image data captured by each camera of the camera array and settings information of each camera that indicate at least the different positions of each camera, timing data for the capture of the video image data by each camera, diaphragm setting information of the diaphragm of each camera, and aperture setting information of the at least one aperture of each camera; and
   a processor configured to:
      create synchronized combined video content of the viewing field of the camera array by using the settings information of each camera including the timing data for the captured video image data to combine and synchronize the video image data captured by each of the cameras,
      receive view perspective data from a viewing device,
      generate a field of view from the synchronized combined video content with the appearance of three dimensional depth to be displayed on the viewing device, wherein the field of view is based on the view perspective data and includes only a portion of the captured video image data of the viewing field with a center section of the field of view having a sharp focus and a peripheral section of the field of view having a soft focus, and
      configure the respective one or more cameras in the camera array that correspond to the center section of the field of view by adjusting at least one of a direction of rotation and a speed of rotation of the at least one aperture to configure respective optical settings of each of the respective one or more cameras to provide the sharp focus for the field of view, and
      configure the respective one or more cameras in the camera array that correspond to the peripheral section of the field of view by adjusting at least one of a direction of rotation and a speed of rotation of the at least one aperture to configure respective optical settings of each of the respective one or more cameras to provide the soft focus for the field of view.

2. The system according to claim 1, wherein the synchronized combined video content of the viewing field has first dimensions corresponding to the viewing field of the viewing field of the camera array and the field of view displayed on the viewing device has second dimensions that are smaller than the first dimensions.

3. The system according to claim 1, wherein the at least one aperture of each of the plurality of cameras is configured to rotate in a clockwise or counterclockwise direction around the diaphragm when the camera captures the video image data.

4. The system according to claim 1, wherein the processor is further configured to adjust the sharp focus of the center section of the field of view and the soft focus of the peripheral section of the field of view by reducing sharpness of focus of sets of pixels of the video image data captured by one or more of the cameras in the camera array.

5. The system according to claim 1, wherein the view perspective data is generated by the viewing device in response to input signal received from a user of the viewing device.

6. The system according to claim 1, wherein the view perspective data is generated by at least one motion sensor configured to detect a position of viewer relative to the viewing device.

7. The system according to claim 1, wherein the view perspective data is generated by an internal sensor of the viewing device, the internal sensor comprising at least one of an accelerometer, a touch sensor, a gyroscope, a magnetometer, an optical sensor, and an inertial tracker.

8. The system according to claim 1, wherein the processor is further configured to access additional content related to the captured video image data and cause the additional content to be displayed on the viewing device in conjunction with the field of view.

9. The system according to claim 1, wherein the plurality of cameras of the camera array are arranged in a planar grid, such the viewing field of the camera array has a planar focus.

10. The system according to claim 1, wherein the plurality of cameras of the camera array are arranged in a non-planar grid, such the viewing field of the camera array has a non-planar focus.

11. The system according to claim 10, wherein the non-planar grid comprises a parabolic section consisting of at least one of a concave shape, a convex shape, a spherical shape and a hemispherical shape.

12. The system according to claim 1, wherein at least a portion of the plurality of cameras are configured to move to different positions relative to each other while the plurality of cameras capture the video image data of the viewing field of the camera array.

13. The system according to claim 1, wherein the processor is further configured to create the synchronized combined video content using the captured video image data by each of the cameras and relative positions and angles of each of the cameras with respect to the other cameras in the camera array.

14. The system according to claim 13, wherein the processor is further configured to adjust the relative positions and angles of at least a portion of the plurality of cameras based on changes in the viewing field of the camera array.

15. The system according to claim 1, further comprising a plurality of microphones at different positions of at least a portion of the plurality of cameras locations, with each microphone being configured to capture audio data that may be played by the viewing device when the generated field of view is displayed on the viewing device.

16. A method for generating video content having an appearance of three dimensional depth, the method comprising:
   capturing video image data of respective portions of a viewing field by a plurality of cameras, respectively, in a camera array with each camera arranged at different positions relative to each other and each of the plurality of cameras including a diaphragm configured to rotate during capture of the video image data and at least one aperture located off-center in the diaphragm and configured to rotate around the diaphragm when each camera captures the respective video image data;

storing, in electronic memory, the video image data captured by each camera of the camera array;

storing, in the electronic memory, settings information of each camera that indicate at least the different positions of each camera, timing data for the capture of the video image data by each camera, diaphragm setting information of the diaphragm of each camera, and aperture setting information of the at least one aperture of each camera;

creating, by at least one processor, synchronized combined video content of the viewing field of the camera array by using the settings information of each camera including the timing data for the captured video image data to combine and synchronize the video image data captured by each of the cameras;

receiving view perspective data from a viewing device;

generating, by the at least one processor, a field of view from the synchronized combined video content with the appearance of three dimensional depth to be displayed on the viewing device, wherein the field of view is based on the view perspective data and includes only a portion of the captured video image data of the viewing field with a center section of the field of view having a sharp focus and a peripheral section of the field of view having a soft focus;

configuring, by the at least one processor, the respective one or more cameras in the camera array that correspond to the center section of the field of view by adjusting at least one of a direction of rotation and a speed of rotation of the at least one aperture to configure respective optical settings of each of the respective one or more cameras to provide the sharp focus for the field of view; and configuring, by the at least one processor, the respective one or more cameras in the camera array that correspond to the peripheral section of the field of view by adjusting at least one of a direction of rotation and a speed of rotation of the at least one aperture to configure respective optical settings of each of the respective one or more cameras to provide the soft focus for the field of view.

17. The method according to claim 16, wherein the synchronized combined video content of the viewing field has first dimensions corresponding to the viewing field of the viewing field of the camera array and the field of view displayed on the viewing device has second dimensions that are smaller than the first dimensions.

18. The method according to claim 16, further comprising adjusting the sharp focus of the center section of the field of view and the soft focus of the peripheral section of the field of view by reducing sharpness of focus of sets of pixels of the video image data captured by one or more of the cameras in the camera array.

19. The method according to claim 16, further comprising generating the view perspective data by the viewing device in response to input signal received from a user of the viewing device.

20. The method according to claim 16, further comprising generating the view perspective data by at least one motion sensor configured to detect a position of viewer relative to the viewing device.

21. The method according to claim 16, further comprising generating the view perspective data by an internal sensor of the viewing device, wherein the internal sensor comprises at least one of an accelerometer, a touch sensor, a gyroscope, a magnetometer, an optical sensor, and an inertial tracker.

22. The method according to claim 16, further comprising:
  accessing additional content related to the captured video image data; and
  causing the additional content to be displayed on the viewing device in conjunction with the field of view.

23. The method according to claim 16, further comprising arranging the plurality of cameras of the camera array in a planar grid, such the viewing field of the camera array has a planar focus.

24. The method according to claim 16, further comprising arranging the plurality of cameras of the camera array in a non-planar grid, such the viewing field of the camera array has a non-planar focus.

25. The method according to claim 24, wherein the non-planar grid comprises a parabolic section consisting of at least one of a concave shape, a convex shape, a spherical shape and a hemispherical shape.

26. The method according to claim 16, further comprising moving at least a portion of the plurality of cameras to different positions relative to each other while the plurality of cameras capture the video image data of the viewing field of the camera array.

27. The method according to claim 16, further comprising creating the synchronized combined video content using the captured video image data by each of the cameras and relative positions and angles of each of the cameras with respect to the other cameras in the camera array.

28. The method according to claim 27, further comprising adjusting the relative positions and angles of at least a portion of the plurality of cameras based on changes in the viewing field of the camera array.

29. The method according to claim 16, capturing audio data by a plurality of microphones arranged at different positions of at least a portion of the plurality of cameras locations, wherein the audio data may be played by the viewing device when the generated field of view is displayed on the viewing device.

* * * * *